(12) United States Patent
Carscallen, II et al.

(10) Patent No.: US 7,592,544 B2
(45) Date of Patent: Sep. 22, 2009

(54) SNAG-FREE COILED CABLE ASSEMBLY FOR A LIFT TRUCK

(75) Inventors: Charles Harvey Carscallen, II, Lawrenceville, GA (US); James Stephen Hughes, Cumming, GA (US); Michael Holladay, Acworth, GA (US); Michael Steven Meyers, Marietta, GA (US)

(73) Assignee: EMS Technologies, Inc., Norcross, GA (US)

( * ) Notice: Subject to any disclaimer, the term of this patent is extended or adjusted under 35 U.S.C. 154(b) by 348 days.

(21) Appl. No.: 11/369,009

(22) Filed: Mar. 7, 2006

(65) Prior Publication Data

US 2007/0222686 A1    Sep. 27, 2007

(51) Int. Cl.
*H01B 7/06* (2006.01)
(52) U.S. Cl. .................. 174/69; 138/118; 191/12 R
(58) Field of Classification Search ............... 191/12 R, 191/12.2 R; 138/118, 119; 174/69; 187/233, 187/235
See application file for complete search history.

(56) References Cited

U.S. PATENT DOCUMENTS

| 3,632,140 | A | * | 1/1972 | Paine et al. .................. 285/18 |
| 3,993,860 | A | * | 11/1976 | Snow et al. .................. 174/69 |
| 4,009,734 | A | * | 3/1977 | Sullivan ..................... 138/125 |
| 4,053,118 | A | * | 10/1977 | Aikins ...................... 242/378.2 |
| 4,667,460 | A | * | 5/1987 | Kramer ...................... 56/17.5 |
| 4,988,833 | A | * | 1/1991 | Lai ............................ 174/69 |
| 6,262,371 | B1 | * | 7/2001 | Allen ........................ 174/68.1 |

* cited by examiner

*Primary Examiner*—Dean J Kramer
(74) *Attorney, Agent, or Firm*—Hogan & Hartson, LLP (57) ABSTRACT

A cable assembly for a lift truck includes, in one exemplary embodiment, a transportation cable loosely housed in a self-retracting hose preformed to default to a coiled shape when no pressure is applied to elongate the self-retracting hose. The self-retracting hose has a slick external surface that is selected to prevent adherence of the surface to any portion of the lift truck. The transportation cable is used for transporting a communication signal and/or a power supply voltage.

10 Claims, 8 Drawing Sheets

1305 provide an air hose that is an original equipment manufacture (OEM) component, the air hose preformed to default to a coiled shape when no pressure is applied to elongate the air hose

1310 insert a transportation cable through the air hose, the transportation cable configured to transport a communication signal or a power supply

SNAG-FREE COILED CABLE ASSEMBLY FOR A LIFT TRUCK

DESCRIPTION OF THE RELATED ART

A cable assembly typically contains an electrical conductor enclosed in an external jacket or sheath that is selected to provide protection to the conductor when the cable assembly is used for various applications, often in adverse operating conditions. In a first application, the cable assembly is used to transport a signal between two relatively stationary objects—for example, to transport a video signal from a videocassette recorder (VCR) to a television set. In this particular example, the external jacket of the cable assembly is made of soft, flexible material that allows the cable assembly to be flexibly routed around various stationary objects. This cable assembly is moved infrequently—mostly during installation between the VCR and the TV. Consequently, the flexible external jacket is not unduly stressed.

However, the flexible external jacket of the cable assembly undergoes a large amount of stress when used in a second application where the cable assembly is used to transport a signal and/or power between two objects that move relative to one another. Specific attention is drawn to one exemplary application wherein the cable assembly is used to transport a signal between a radio frequency identification (RFID) controller located in a cab of a lift truck and an RFID sub-assembly mounted on a moveable carriage of the lift truck.

Unfortunately, existing cable assembly solutions in this particular application suffer from several handicaps. The first handicap relates to cable droop. Because the carriage moves relative to the chassis of the lift truck, the cable assembly is typically made long enough to accommodate carriage movement when the carriage is raised to its highest position above ground level. Unfortunately, this leads to cable droop when the carriage is subsequently lowered to ground level. The drooping cable creates interference with normal lift truck operation and also makes the cable vulnerable to snagging on various moving parts thereby resulting in damage to the cable. Certain solutions have been proposed to overcome the issue of cable droop. In one such solution, a retracting mechanism incorporating a pick-up spool has been used. Unfortunately, the frequent stretching and rotational tension associated with the pick-up spool proves detrimental to many conventional cable assemblies.

The second handicap in existing cable assembly solutions relates to cable damage arising from the hostile environment in which the lift truck is operated. Sharp objects as well as corrosive liquids and gases that are present in this hostile environment can cause the external jacket of a conventional cable assembly to be breached thereby exposing and/or damaging the electrical conductors within. Here again, certain solutions have been proposed to overcome this issue. In one such solution, a reinforced jacket is used. However, cable flexibility is sacrificed when such a reinforced external jacket is used thereby leading to installation difficulties as well as subsequent operational difficulties.

Based on the shortcomings mentioned above, an unaddressed need exists in the industry to provide a better cable assembly that can be used on a lift truck.

SUMMARY

A cable assembly for a lift truck includes, in one exemplary embodiment, a transportation cable loosely housed in a self-retracting hose preformed to default to a coiled shape when no pressure is applied to elongate the self-retracting hose. The self-retracting hose has a slick external surface that is selected to prevent adherence of the surface to any portion of the lift truck. The transportation cable is used for transporting a communication signal and/or a power supply voltage.

Clearly, some alternative embodiments may exhibit advantages and features in addition to, or in lieu of, those mentioned above. It is intended that all such alternative embodiments be included within the scope of the present invention, and be protected by the accompanying claims.

BRIEF DESCRIPTION OF THE DRAWINGS

Many aspects of the invention can be better understood with reference to the following drawings. The components in the drawings are not necessarily to scale. Instead, emphasis is placed upon clearly illustrating the principles of the invention. Moreover, in the drawings, like reference numerals designate corresponding parts throughout the several views.

DETAILED DESCRIPTION

The various embodiments in accordance with the invention generally describe a coiled cable assembly that is used to transport one or more signals between two radio frequency identification (RFID) components mounted on a lift truck. Typically, the two components move relative to one another during normal operation of the lift truck and the coiled cable assembly operates to accommodate this movement without snagging on moving parts or drooping excessively. In one exemplary embodiment, the first RFID component is a RFID controller located in an operator's cab of the lift truck and the second RFID component is an antenna mounted on a part of the lift truck generally referred to as a carriage that is used for lifting a load for transportation. In this example, the cab is termed a "stationary" part and the carriage is referred to as a "movable" part that moves with reference to the cab.

It will be understood that the term "lift truck" as used herein, encompasses various types of vehicles intended for moving goods from one location to another, such as from a first shelf to a second shelf of a warehouse. A side-clamper and a forklift are two among many examples of a lift truck. A side-clamper is used to clasp a load in a manner similar to that employed by a human when holding a box along two vertical sides. The operation of a forklift is described below in more detail with reference to the invention.

Figure 1:
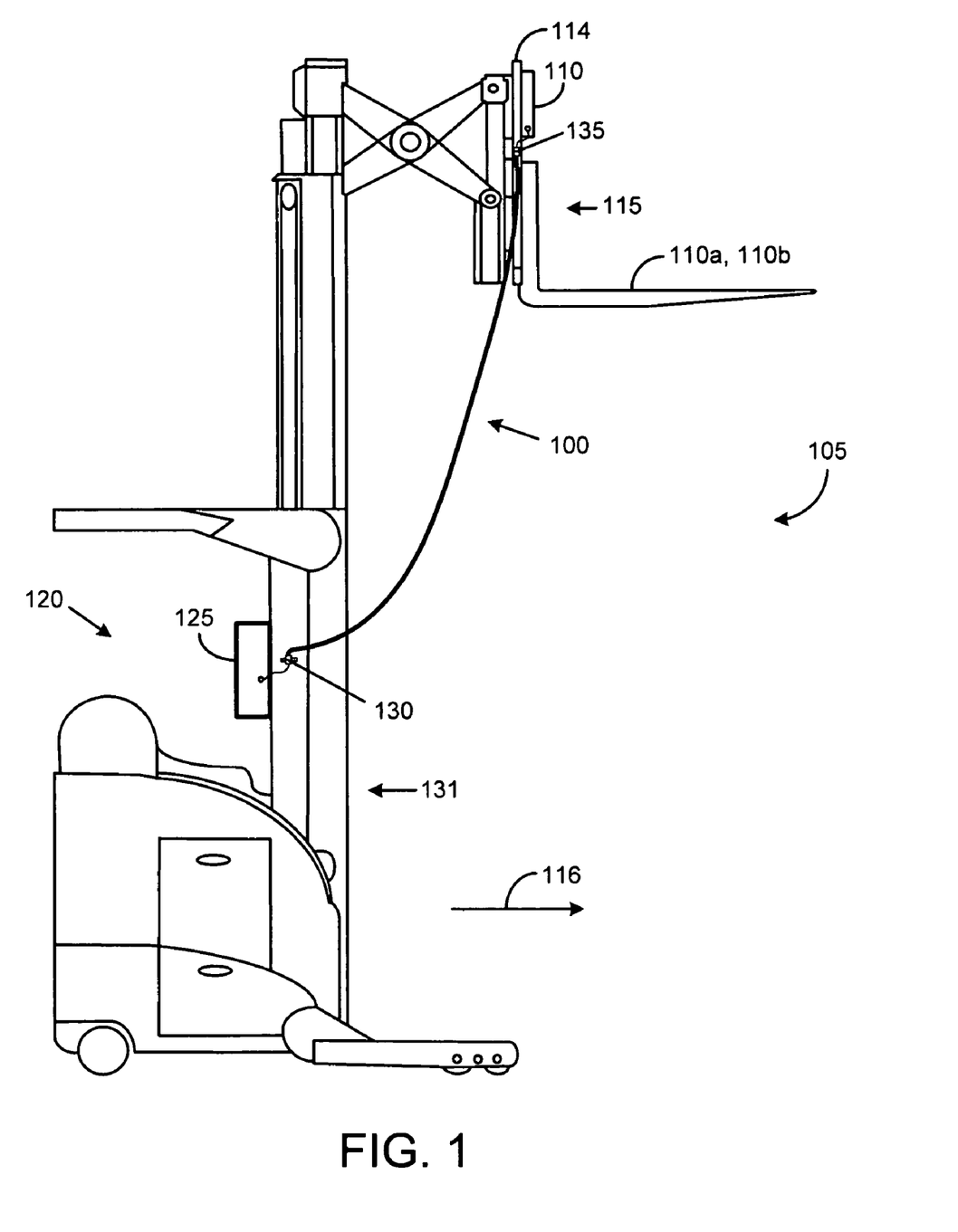
FIG. 1 shows an exemplary embodiment in accordance with the invention of a snag-free coiled cable assembly in an exemplary elongated state when incorporated into a lift truck.

FIG. 1 shows a forklift 105 incorporating a snag-free coiled cable assembly 100 in one exemplary embodiment in accordance with the invention. Forklift 105 is used here merely for purposes of illustration and it will be understood that in various embodiments, snag-free coiled cable assembly 100, hereinafter referred to as cable assembly 100, may be employed in various other types of lift trucks in various alternative configurations without detracting from the spirit of the invention.

Forklift 105 has a pair of tines 110a and 110b that is used to lift a load for transporting the load from one location to another. Tines 110a and 110b are mounted on a moveable carriage 115. Typically, an operator (not shown) drives forklift 105 in the direction indicated by arrow 116 and inserts tines 110a and 110b under the load before raising carriage 115 above ground level for transporting the load. When forklift 105 reaches its destination, which may be a tall rack of shelves for instance, the lift truck operator adjusts the height of carriage 115 to align the load with a particular shelf upon which the load is to be placed. In certain cases, this shelf is located high enough that carriage 115 has to be moved to its maximally raised position as shown in FIG. 1.

FIG. 1 further shows cable assembly 100 arranged to provide communicative coupling between a first exemplary radio frequency identification (RFID) component—an RFID controller 125, and a second exemplary RFID component—an antenna 110, which is mounted on carriage 115. RFID controller 125 is shown generally mounted in an area 120 occupied by an operator (not shown) of lift truck 105. In some types of lift trucks, area 120 is an enclosed cab within which the operator is seated in front of controls that are used to operate the lift truck.

In one exemplary embodiment of the invention, cable assembly 100 is formed of a self-retracting hose that is preformed to default to a coiled shape when no pressure is applied to elongate the self-retracting hose. The external surface of snag-free coiled cable assembly 100, which will be described below in further detail using other figures, has a slick, slippery texture that resists clinging to any surfaces or components of lift truck 105. For example, when carriage 115 is being lowered from the maximally raised position to the ground level position, snag-free coiled cable assembly 100 tends to slither off various parts of forklift 105 thereby reducing the risk of snagging or binding.

The coils of cable assembly 100 elongate to accommodate movement of carriage 115. For example, when carriage 115 is raised to its highest position, as shown in FIG. 1, cable assembly 100 elongates to such an extent that cable assembly 100 resembles a straight cable without coils.

Cable assembly 100 is anchored at one end using a mounting bracket 130 that is attached to a member of forklift 105. In this example, the member is a vertical beam of a truck mast 131 of forklift 105. Cable assembly 100 is anchored at the other end using a second mounting bracket 135 that is attached to a second member of forklift 105. The second member is typically, a part of forklift 105 that moves with reference to the first member. In this example, the second member is a vertical beam 114 of carriage 115 that moves vertically with reference to the truck mast 131 of forklift 105.

Figure 2:
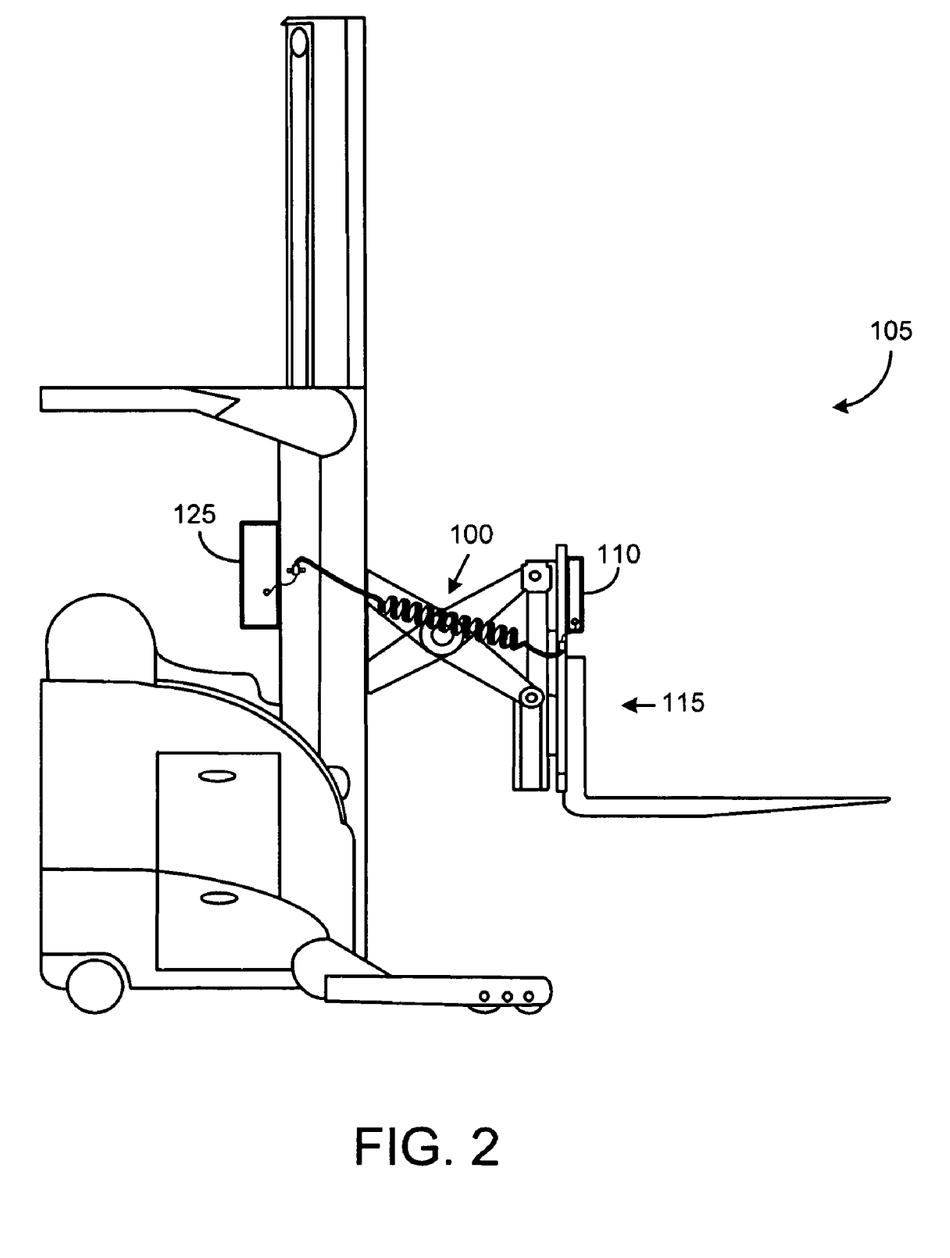
FIG. 2 shows the snag-free coiled cable assembly of FIG. 1 in a default, non-extended state when the carriage of the lift truck is lowered from the maximally raised position.

FIG. 2 shows forklift 105 with carriage 115 lowered to a position where the two exemplary RFID components are level with each other. When carriage 115 is in this position, cable assembly 100 defaults to its quiescent state, wherein cable assembly 100 occupies minimal length along its longitudinal axis, and consequently, has minimal cable droop. In contrast, a conventional, coil-free cable employed in a lift truck for a similar purpose, would suffer from excessive cable droop and run the risk of being accidentally snagged by various objects, including people, in the vicinity of the lift truck.

While the exemplary embodiment of cable assembly 100 depicted in FIG. 1 shows an elongated cable stretched to an extent that no coils are present, it will be understood that in alternative embodiments, cable assembly 100 may contain one or more elongated coils even when carriage 115 is at its maximally raised position. Furthermore, the position of carriage 115 at which cable assembly 100 acquires its unstretched, quiescent shape may be selected to correspond to a position other than the one exemplary position shown in FIG. 2.

Cable assembly 100 may be manufactured in several alternative ways. In one exemplary method, cable assembly 100 is manufactured by using a self-retracting hose made of a material that provides one or more advantageous properties, especially for use in lift truck applications. Some examples of such advantageous properties include, but are not limited to, high coil shape retentivity, high stretchability, high flexibility, high resistance to wear and tear associated with frequent cable movement, resistance to mechanical damage from foreign objects, resistance to chemicals, resistance to fire, and a non-stick surface.

The self-retracting hose may be made of several alternative materials. One example, among many, is a synthetic material such as nylon. Nylon is a ubiquitous material used in various applications. For example, in pneumatic applications, the use of nylon air hoses is well known. However, nylon air hoses have not been readily incorporated into applications where electrical signals or electrical power is to be transported from one electronic/electrical device to another. It will be understood that in the context of this disclosure, the terms "electrical" and "electronic" may be used interchangeably and either term encompasses various types of signals having various parameters such as amplitude, frequency, and phase. It will be further understood that a nylon air hose is used herein merely for purposes of explanation and that the self-retracting hose may be formed of various other alternative materials in other embodiments.

Several exemplary embodiments of the invention will now be described wherein the self-retracting hose of the cable assembly is a nylon air hose. The nylon air hose loosely houses a transportation cable that is used for transporting various types of signals (electrical as well as non-electrical) and/or for transporting one or more power supply voltages.

One example, among many, of an electrical signal carried by the transportation cable is a communications signal. In one case, the communication signal is a low frequency signal such as an audio signal, while in a second case the communication signal is a high frequency signal such as a radio frequency (RF) signal.

One example of a non-electrical signal carried by the transportation cable is an optical communications signal. Examples of power supply voltages carried by the transportation cable include an alternating current (AC) power supply voltage and a direct current (DC) power supply voltage of either or both polarities. It will be understood that the phrase "transporting a power supply voltage" has been used merely for purposes of description, and is meant to encompass power supply-related features, such as various amplitudes of voltages as well as corresponding current carrying capacities, as understood by persons of ordinary skill in the art.

In general, the nature of the application determines the nature of the transportation cable used, as well as the nature of the connectors attached at either end of the transportation cable. For example, when the application is an RFID application wherein an RF signal is to be transported from an RFID device to an antenna, such as the configuration shown in FIGS. 1 and 2, the transportation cable is a coaxial cable with RF connectors attached to either end. On the other hand, when the application is a communications application wherein multiple data/control signals are to be transported from one communications device to another, the transportation cable is a multi-conductor cable with data connectors, such as DB-type connectors, attached to either end. DB-type connectors are known in the art.

Figure 3:
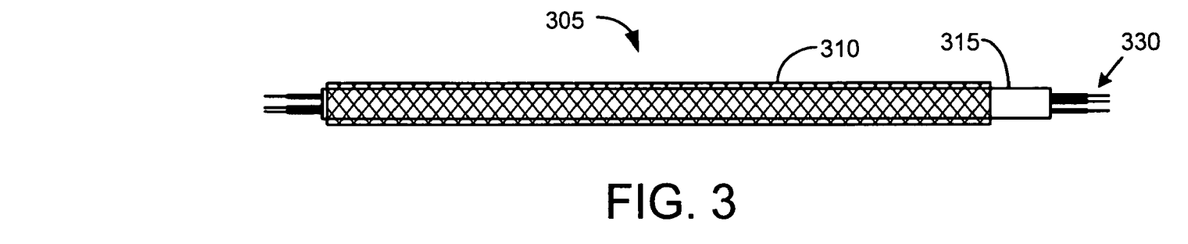
FIG. 3 shows a first exemplary transportation cable that is a component of the snag-free coiled cable assembly in accordance with the invention.

Attention is now drawn to FIG. 3 showing a first exemplary transportation cable 305 used for transporting a communication signal and/or a power supply voltage between two components of a lift truck. Transportation cable 305 is a part of a snag-free coiled cable assembly in accordance with the invention. In this exemplary embodiment, transportation cable 305 is a multi-conductor cable having one or more electrical conductors 330. Electrical conductors 330 are encased in a jacket 315, which may be formed of plastic, vinyl, rubber, teflon or other such jacket material known in the art. Jacket 315 are in turn, encased in a metal jacket 310. In one embodiment, metal jacket 310 is formed of a metal braid. In another embodiment, metal jacket 310 is formed of a metal foil. Metal jacket 310 provides a means for electrically grounding transportation cable 305 as will be described below using FIG. 4.

Figure 4A:
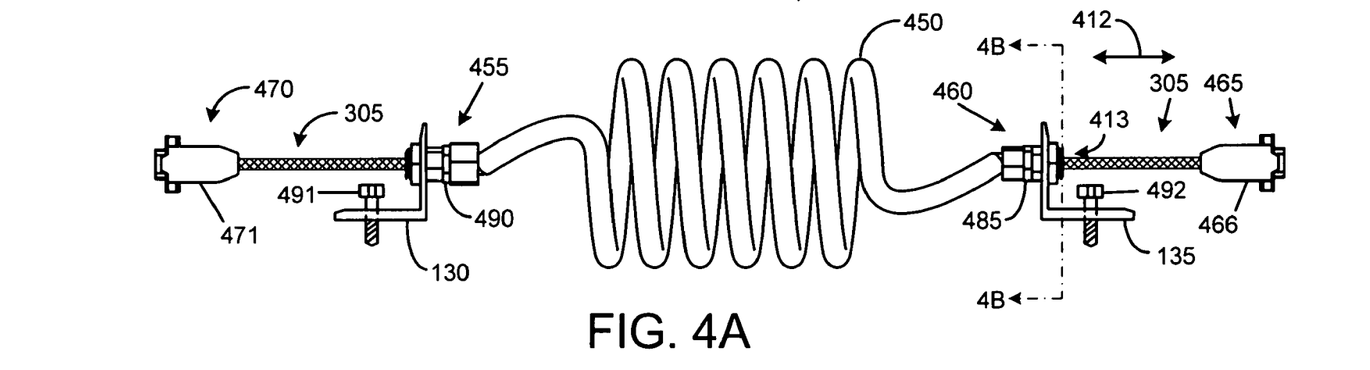
FIG. 4A shows a snag-free coiled cable assembly incorporating the transportation cable shown in FIG. 3.

FIG. 4A shows a snag-free coiled cable assembly 400 that uses a hose 450 preformed to default to a coiled shape when no pressure is applied to elongate hose 450. In one exemplary embodiment, hose 450 is an off-the-shelf air hose made of nylon. Such an air hose, often provided as an original equipment manufacture (OEM) part, is commonly used to provide pressurized air for operating a pneumatic tool—a pneumatic lug wrench, for example. Using an off the shelf component such as the OEM air hose, generally provides certain cost benefits for manufacturing cable assembly 400.

Hose 450 has an air hose connector assembly 455 at one end and a second air hose connector assembly 460 at the other end. Connector assembly 455 includes a mounting bracket 130 that is attached to a member of a forklift as described using FIG. 1. In this exemplary embodiment, mounting bracket 130 is attached to the member using a mounting bolt 491. Connector assembly 460 includes a mounting bracket 135 that is attached to a moving member of a forklift as described using FIG. 1. In this exemplary embodiment, mounting bracket 135 is attached using a mounting bolt 492. Attaching means other than bolts 491 and 492 are employed in alternative embodiments.

Hose 450 houses at least one transportation cable. In a first exemplary embodiment, the transportation cable is electrical transportation cable 305 of FIG. 3. Transportation cable 305 is used for transporting an electrical signal such as, but not limited to, a communication signal or a power supply voltage. Alternative embodiments where other types of transportation cables are used will be described below using other figures.

Transportation cable 305 has a first connector 470 attached to a first end of cable 305 and a second connector 465 attached to an opposing end of cable 305. In this exemplary embodiment, connectors 470 and 465 are DB-type connectors, specifically DB-15 connectors that each has a metal shell housing 15 connector pins. Other types of data/power connectors, such as a serial port connector or a parallel port connector used in a personal computer (PC) application, may be used alternatively.

In an exemplary lift truck application where snag-free coiled cable assembly 400 is used, connector 470 is generally plugged into a first component, which is in this exemplary embodiment, a tag reader of an RFID system (not shown) of the lift truck and connector 465 is plugged into a second component of the RFID system such as an RFID controller unit. In this exemplary application, cable assembly 400 operates as a communication cable carrying RFID signals and/or one or more power supply voltages between the RFID tag reader and the RFID controller.

Connector 470 of transportation cable 305 has a metal shell 471. Similarly, connector 465 also has a metal shell 466. Metal jacket 310 of transportation cable 305 is electrically connected to at least one of the two metal shells 471 and 466. Consequently, when either one of the respective connectors is plugged into one of the two RFID components that is electrically connected to the chassis of the lift truck, transportation cable 305 is also grounded. When transportation cable 305 is thus grounded, electrostatic buildup as a result of frequent movement of hose 450 is safely propagated away from the RFID components thereby protecting the components from harmful electrostatic charges.

It will be understood that metal sheath 310 can be grounded in various alternative ways. For example, a separate ground wire may be attached to metal sheath 310, perhaps with a metal collar, and a remote end of the ground wire connected to a suitable grounding element—such as mounting bolt 492 for example. This arrangement permits cable assembly 400 to be grounded without either connector 465 or connector 470 being plugged into the respective RFID components.

Figure 4B:
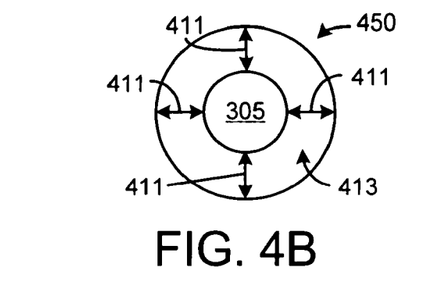
FIG. 4B shows a cross-sectional view of the snag-free coiled cable assembly of FIG. 4A.

Transportation cable 305 is loosely housed inside hose 450. The loose housing is attributed in part, to an airgap 413 that exists between the external surface of transportation cable 305 and the internal surface of hose 450. In the exemplary embodiment shown in FIGS. 3 and 4, the external surface of metal sheath 310 is the external surface of transportation cable 305. The slick inner surface of hose 450 minimizes friction between the external surface of transportation cable 305 and hose 450.

Airgap 413 permits a freedom of movement for transportation cable 305 along the length of hose 450, as indicated by bidirectional arrow 412. This freedom of movement provides mechanical strain relief to transportation cable 305 when the moving member of the lift truck moves with reference to the stationary member. When so desired, this freedom of movement may be curtailed by anchoring transportation cable 305 to either or both ends of hose 450. Such an anchoring may be carried out in several ways. For example, an adhesive may be used to anchor an external surface of transportation cable 305 on to connector 460 and/or connector 455 of hose 450.

Airgap 413 also permits a radial freedom of movement for transportation cable 305 with reference to hose 450. To describe this aspect in more detail, attention is drawn to FIG. 4B, which shows a cross-sectional view of coiled cable assembly 400 along the 4B-4B axis shown in FIG. 4A. Transportation cable 305 has a freedom of movement inside hose 450 in radial directions, as indicated by bi-directional arrows 411.

The radial freedom of movement accommodates, among several aspects, an increase in a cross-sectional area of transportation cable 305 due to a twisting of transportation cable 305 inside hose 450. In one case, the increase in the cross-sectional area of transportation cable 305 occurs because connectors 455 and 460 are anchored to members on the stationary and movable parts of the lift truck respectively, while connectors 465 and 470 are plugged into two RFID components that generate a twist in transportation cable 305 when the movable part is in motion relative to the stationary part of the lift truck.

In one exemplary embodiment, airgap 413 is selected to have a dimension that is related to a diameter of transportation cable 305. For example, airgap 413 may be selected to be twice as large as the diameter of transportation cable 305.

In another exemplary embodiment, airgap 413 is selected to have a dimension that allows a certain volume of fluid such as a gas or a liquid, to flow through hose 450 simultaneous to transportation of signals through transportation cable 305, when the application warrants such a dual-purpose functionality. Such applications are not necessarily confined to lift truck applications and include for example, medical applications and various industrial applications. One example of an industrial application pertains to the petroleum industry while a second example of an industrial application pertains to a factory floor.

In certain embodiments, metal sheath 310 is connected to either, or both, connector assemblies 460 and 455. Consequently, metal sheath 310 is connected to the chassis of the lift truck when either or both connector assemblies 460 and 455 are mounted on the lift truck thereby providing an electrical chassis ground to metal sheath 310 of transportation cable 305.

Connector assembly 455 incorporates a first swivel joint 490 and connector assembly 460 incorporates a second swivel joint 485. Because the two ends of cable assembly 400 are anchored by mounting brackets 130 and 135, the two swivel joints 485 and 490 allow each end of cable assembly 400 to swivel around a longitudinal axis of the respective connector assemblies 460 and 455. The rotational freedom provided by the two swivel joints 485 and 490 minimizes twisting and/or tangling of cable assembly 400 when the two ends of cable assembly 400 move relative to one another during operations of the lift truck.

Furthermore, the rotational freedom provided by the two swivel joints 485 and 490 minimizes mechanical wear and tear on transportation cable 305 that is housed inside hose 450 by minimizing the amount of cable twist imposed on transportation cable 305. This is in contrast to a conventional cable that is firmly anchored at both ends with no rotational freedom of movement. In such a conventional cable, the twisting action can lead to mechanical damage at the anchored ends, for example between a cable jacket and a connector shell. Alternatively, the twisting action can cause the connectors of the conventional cable to twist loose thereby leading to a poor electrical connection.

Figure 5:
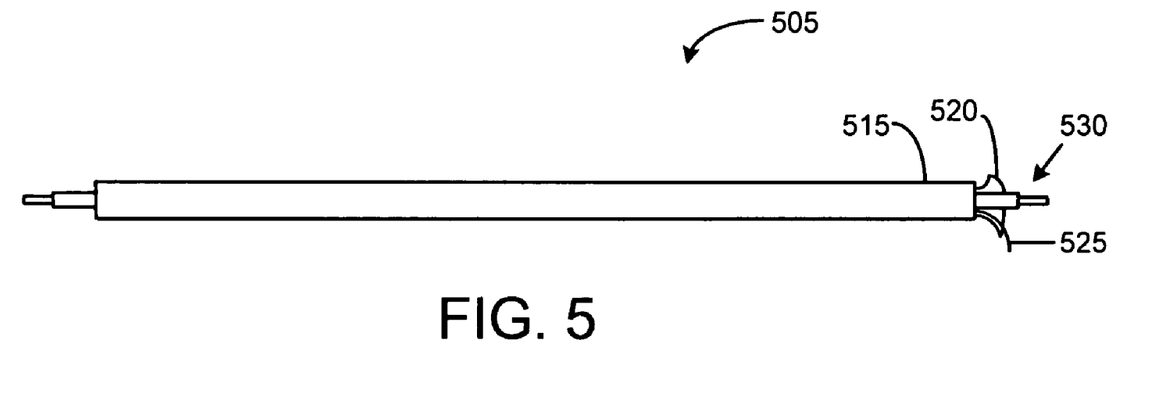
FIG. 5 shows a second exemplary transportation cable that is a component of a snag-free coiled cable assembly in accordance with the invention.

Attention is now drawn to FIG. 5, which shows a second exemplary transportation cable 505 that is a component of a snag-free coiled cable assembly in accordance with the invention. In this exemplary embodiment, transportation cable 505 is a coaxial cable suitable for carrying RF signals. Transportation cable 505 contains a metal center conductor 530 surrounded by an insulating layer, then a metal jacket 520, which in turn is surrounded by an external jacket 515.

In the embodiment shown in FIG. 5, metal jacket 520 is formed of a metal foil. However, in an alternative embodiment, metal jacket 520 is formed of a metal braid. When metal jacket 520 is formed of a metal foil, a metal wire 525 is typically provided for grounding the metal foil. Grounding of transportation cable 505 having either one of the two metal jackets will be described below using FIG. 6.

Figure 6:
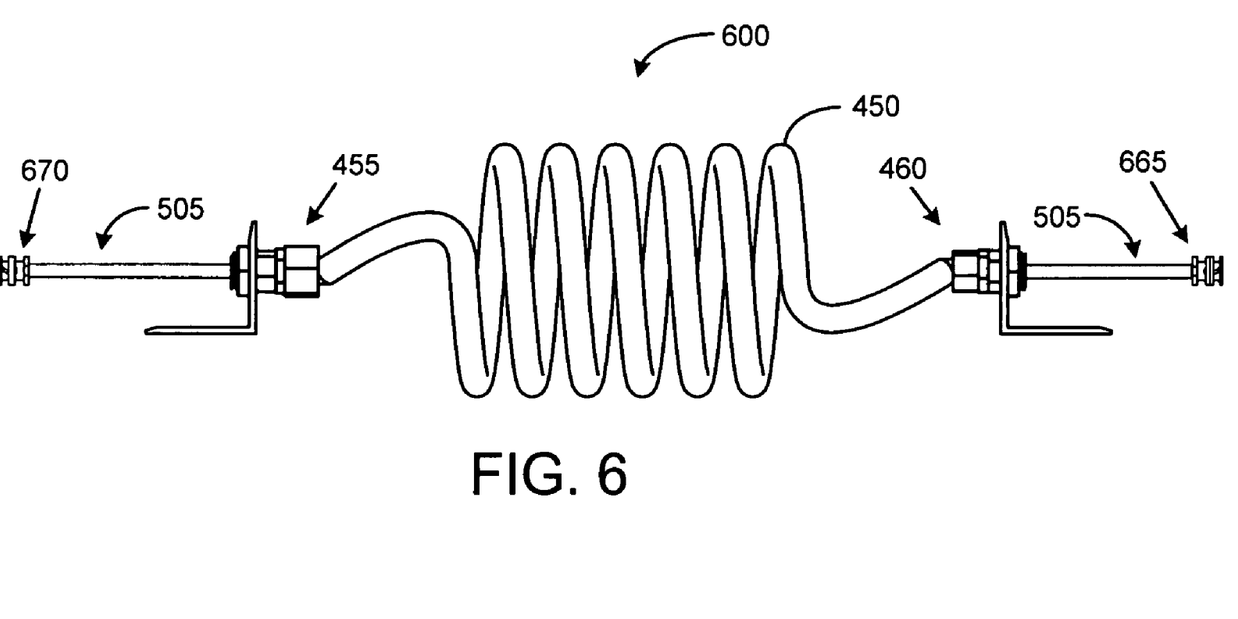
FIG. 6 shows a snag-free coiled cable assembly incorporating the transportation cable shown in FIG. 5.

FIG. 6 shows a snag-free coiled cable assembly 600 incorporating transportation cable 505 shown in FIG. 5. A first RF connector 670 is assembled on one end of transportation cable 505 with a second RF connector 665 assembled on the other end. RF connectors are assembled on to transportation cable 505 in a manner known in the art, whereby metal jacket 520 is electrically connected to the respective bodies of the RF connectors.

In an exemplary lift truck application, connector 670 is generally plugged into a first component, for example, a tag reader of an RFID system (not shown) of the lift truck and connector 665 is plugged into a second component of the RFID system. The second component may be, for example, an antenna. In such an exemplary application, cable assembly 600 operates as a communication cable carrying RFID signals between the RFID tag reader and the antenna. Either one or both RFID components are electrically connected to the chassis of the lift truck—for example, by the use of one or more metal mounting bolts. Consequently, when either one of the connectors 670 or 665 is plugged into either one of the two RFID components that is electrically connected to the chassis of the lift truck, transportation cable 505 is also grounded.

Figure 7:
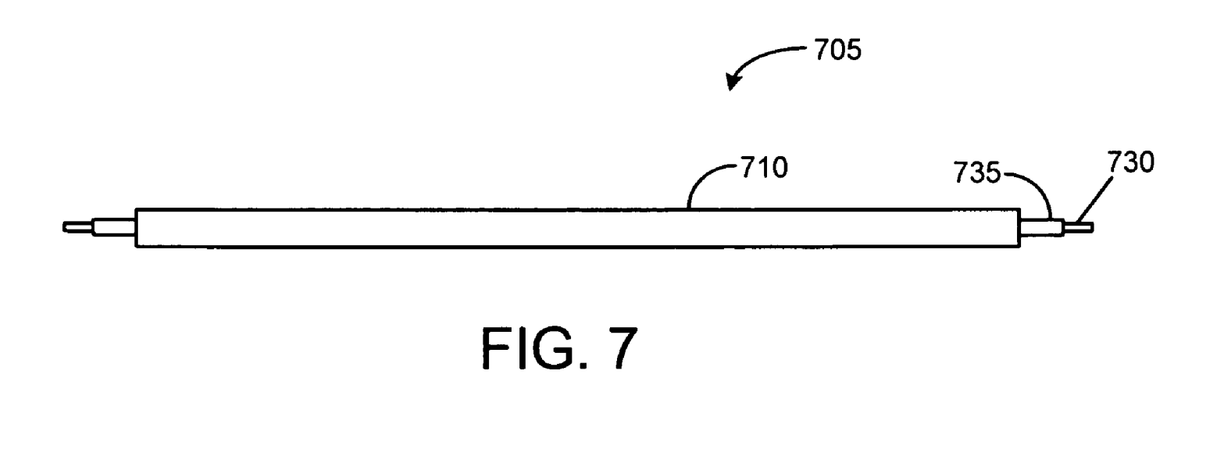
FIG. 7 shows a third exemplary transportation cable that is a component of a snag-free coiled cable assembly in accordance with the invention.

FIG. 7 shows a third exemplary transportation cable 705 that is a component of a snag-free coiled cable assembly in accordance with the invention. In this exemplary embodiment, transportation cable 705 is an optical cable suitable for carrying optical signals. Transportation cable 705 contains an optical fiber 730 surrounded by one or more external jackets such as jacket 735 and jacket 710. An optical cable is typically immune to electrical disturbances. Consequently, transportation cable 705 does not incorporate a ground sheath or metal jacket.

Figure 8:
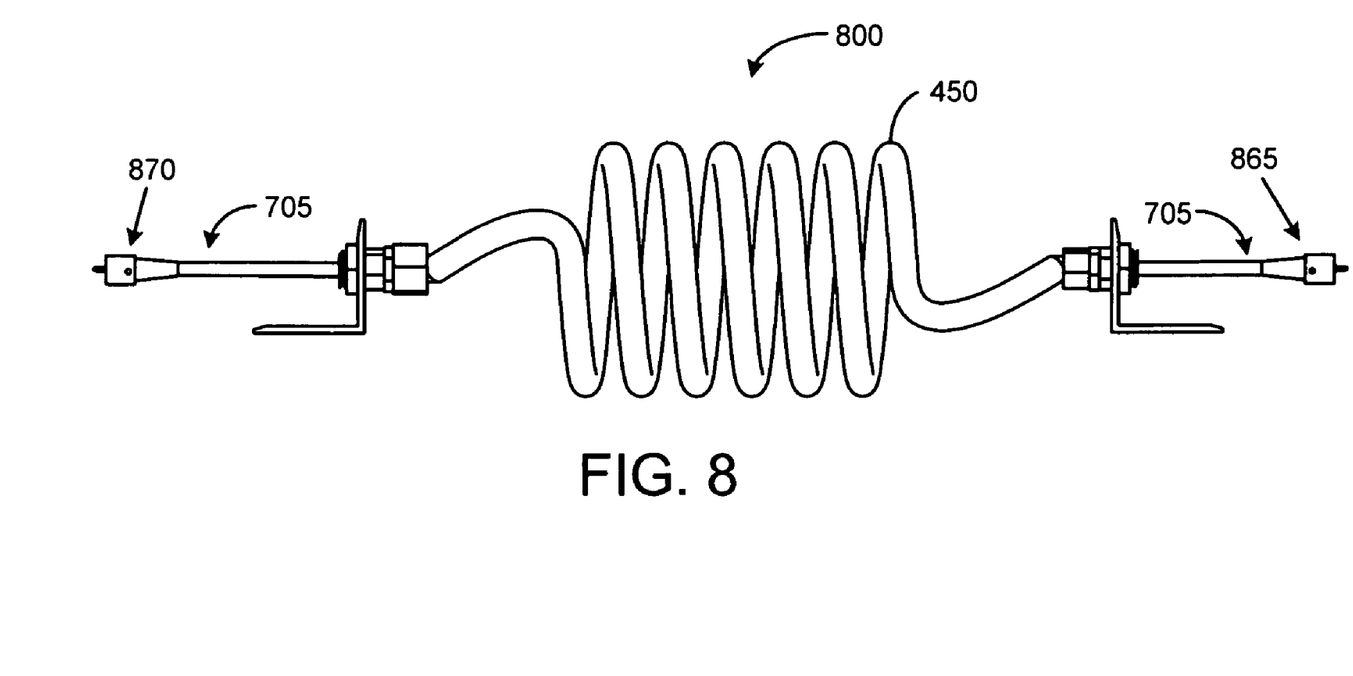
FIG. 8 shows a snag-free coiled cable assembly incorporating the transportation cable shown in FIG. 7.

FIG. 8 shows a snag-free coiled cable assembly 800 incorporating transportation cable 705 shown in FIG. 7. A first optical connector 870 is assembled on one end of transportation cable 705 with a second optical connector 865 assembled on the other end.

Figure 9:
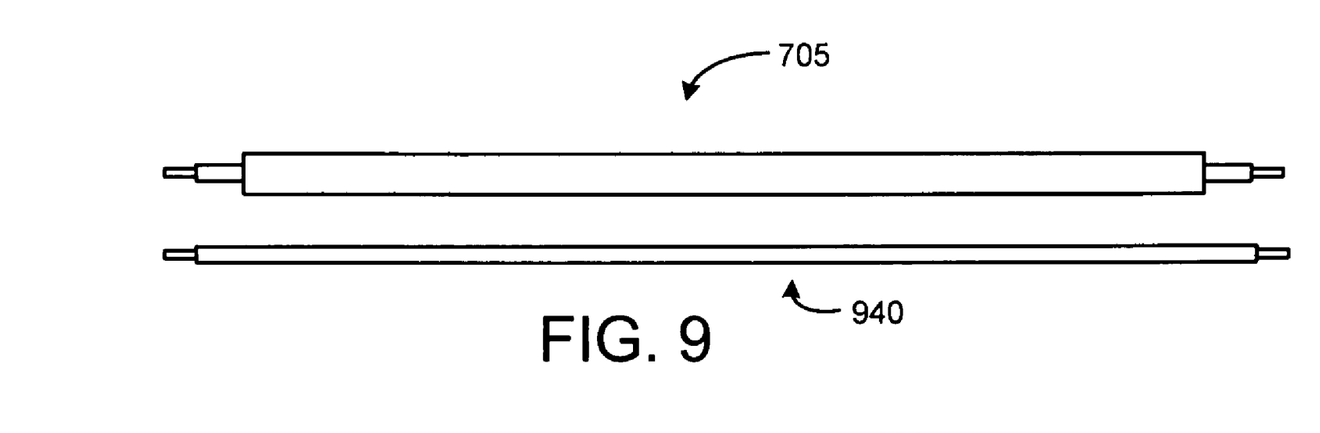
FIG. 9 shows a pair of exemplary transportation cables that is a component of a snag-free coiled cable assembly in accordance with the invention.

FIG. 9 shows a pair of exemplary transportation cables that is a component of a snag-free coiled cable assembly in accordance with the invention. The pair of cables has a first transportation cable, which in this example is an optical cable, such as transportation cable 705 of FIG. 7. In other embodiments, transportation cable 705 is an electrical transportation cable, such as the ones described above using FIGS. 3 and 5.

The second of the pair of transportation cables is a power cable 940 used for transporting power between two components mounted on a lift truck. In this exemplary embodiment, a metal jacket or ground shield has not been incorporated into either cable because optical signals transported in transportation cable 705 are generally immune to electrical disturbances emanating from transportation cable 940 or other electrical sources. However, transportation cable 940 may, in certain applications, be encased in a metal jacket where electromagnetic shielding is needed for reducing emissions related to electromagnetic interference (EMI).

The physical characteristics of transportation cable 940 are determined by various parameters, such as: current carrying capacity, insulation for high voltage, effective electrical resistance, and resistance to mechanical wear and tear.

Figure 10:
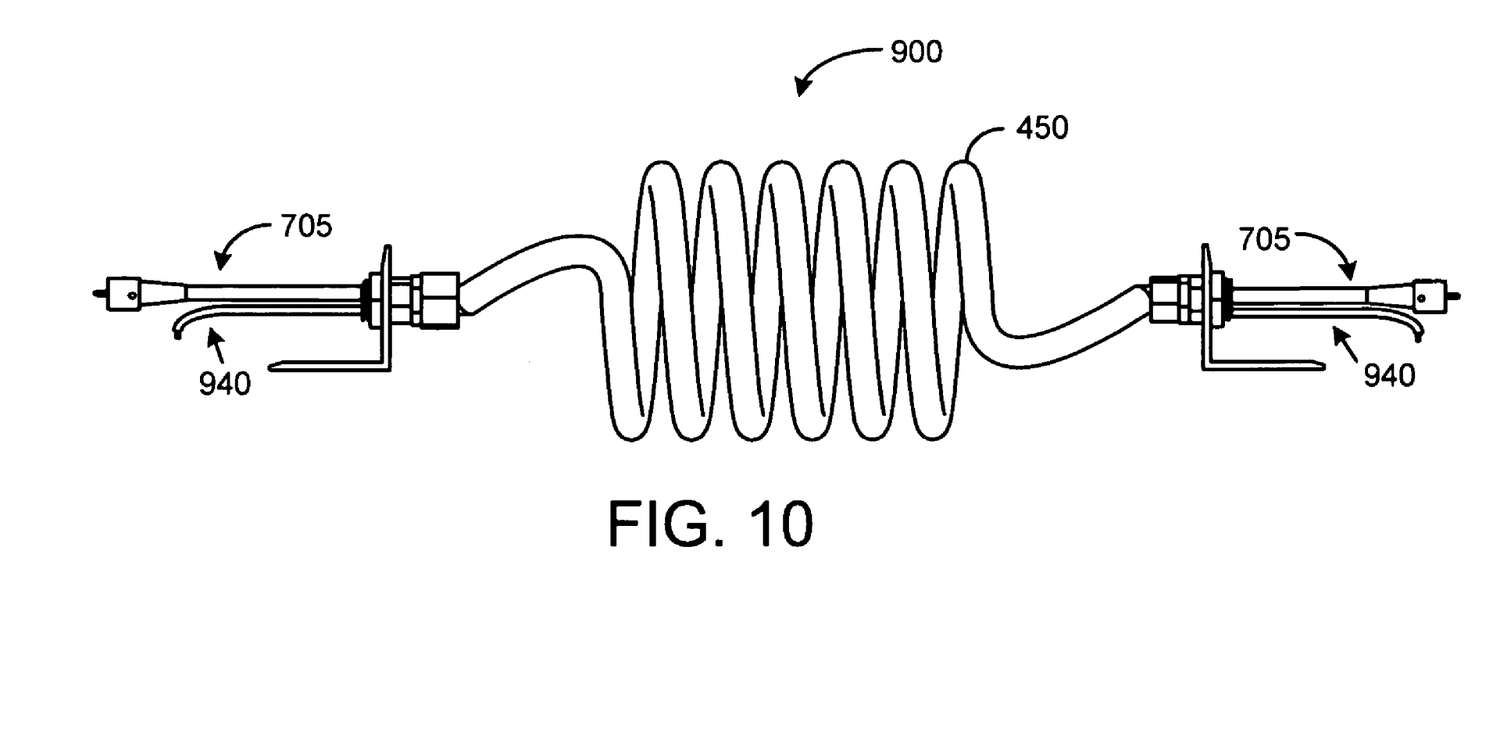
FIG. 10 shows a snag-free coiled cable assembly incorporating the transportation cables shown in FIG. 9.

FIG. 10 shows a snag-free coiled cable assembly 900 that includes a hose 450 in which is housed a transportation cable 705 having optical connectors attached at either ends. Transportation cable 705 is used to provide transport of optical signals between two components mounted on a lift truck. Also housed in hose 450 is transportation cable 940, which is used to transport a power supply voltage between two components of the lift truck.

In one exemplary application, transportation cable 705 carries an RFID signal from a tag reader to an RFID controller, while transportation cable 940 carries a positive power supply voltage. In an alternative embodiment, in lieu of transportation cable 940, a pair of transportation cables is used to transport power with one of the pair of cables carrying a positive voltage and the other a negative voltage.

The two transportation cables, as well as any additional cables that may be included, are loosely housed in hose 405. The loose housing is attributed in part, to an airgap that exists between the external surfaces of each of the transportation cables and the internal surface of hose 450. In this exemplary embodiment, the airgap provides a first freedom of movement for each or both of the transportation cables with reference to hose 450; and further provides a second freedom of movement for each of the transportation cables with reference to the other. As a result of the second freedom of movement, transportation cable 940 may be inserted or extracted from hose 450 independent of transportation cable 705.

Alternatively, the two, or more, transportation cables may be bundled together, with ties for example, such that the second freedom of movement is curtailed.

Figure 11:
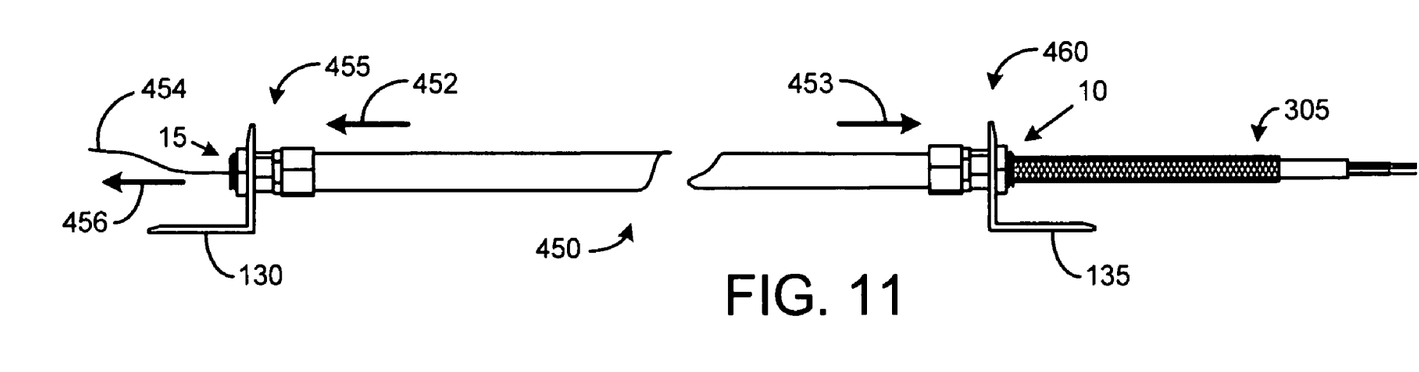
FIG. 11 shows an exemplary configuration for inserting a transportation cable into a hose in accordance with the invention.

FIG. 11 shows an exemplary configuration for inserting a transportation cable 305 into a hose 450 in accordance with the invention. As described above, hose 450 is preformed to default to a coiled shape when no pressure is applied to elongate the self-retracting hose. In this exemplary configuration, the two ends of hose 450 are linearly extended in opposite directions as indicated by arrows 452 and 453. In one case, the linear extension is carried out until hose 350 is full stretched straight. In a second case, the linear extension is carried out partially. Consequently, hose 350 may retain a few coils, with an elongated pitch.

Attention is drawn to draw line 454, which is selected of a suitable material such as metal or nylon for example. One end (not shown) of draw line 454 is attached to one end (not shown) of transportation cable 305. The other end of draw line 454 is inserted into an opening 10 at one end of hose 450, threaded through, and drawn out from another opening 15 at the opposing end of hose 450. Draw line 454 is then pulled in the direction indicated by arrow 456 thereby pulling transportation cable 305 through hose 450.

In a first exemplary application, draw line 454 is a fishing wire. The fishing wire can be drawn through hose 450 using gravity, or can be forced through hose 450 using air pressure. In a second exemplary application, draw line 454 is a semi-rigid element that provides enough stiffness to allow draw line 454 and transportation cable 305 attached thereto, to be inserted and pushed through hose 450. One example of such a semi-rigid element employed in plumbing applications is known in the art as a "snake." The snake is generally inserted into a drainage pipe and propagated through the pipe for removing objects such as hair and other foreign objects that may be clogging the drainage pipe. In a third exemplary application, draw line 454 is a rigid metal rod or wire that provides rigidity when draw line 454 is inserted into opening 10 and pushed through hose 450 before emerging from opening 15.

Figure 12:
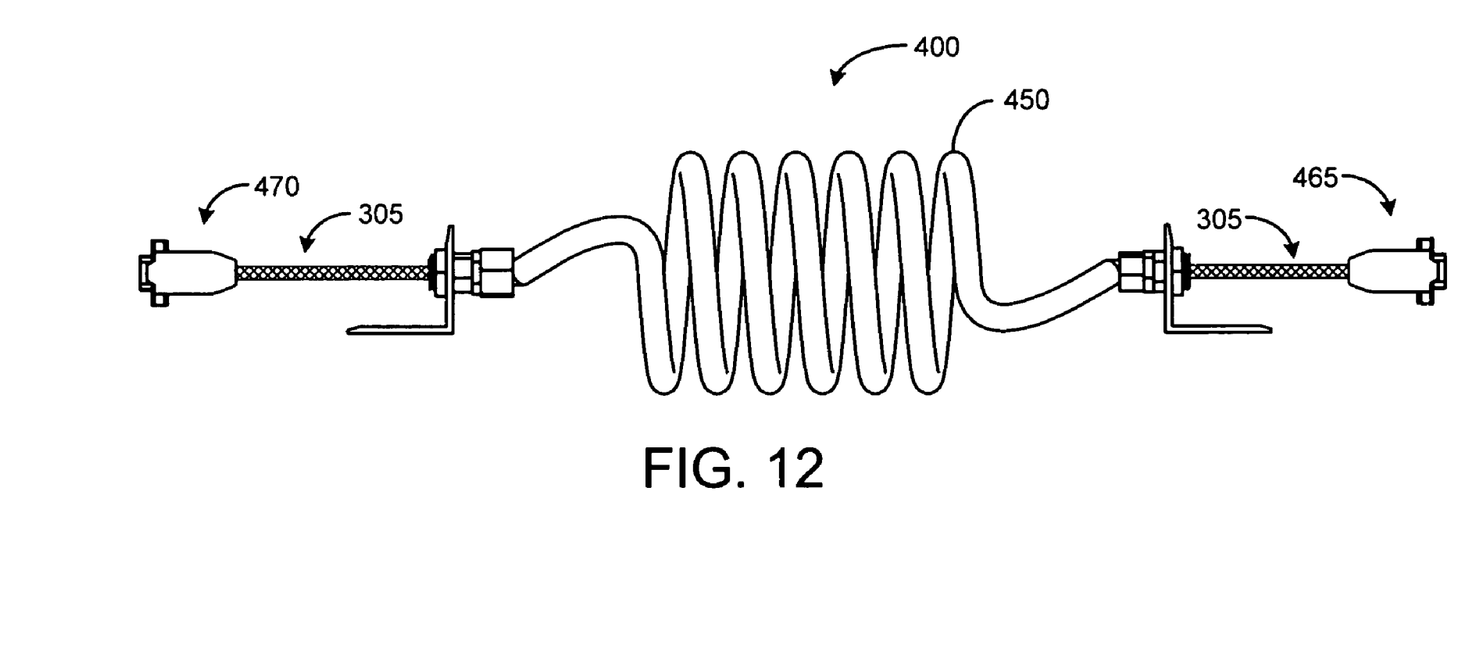
FIG. 12 shows exemplary connectors attached to the transportation cable after the transportation cable of FIG. 11 is inserted into the hose.

FIG. 12 shows exemplary connectors 470 and 465 attached to transportation cable 305 after transportation cable 305 has been inserted through hose 450. In this exemplary embodiment, connectors 470 and 465 are DB15 connectors. In other embodiments, other types of connectors are used.

It will be understood that there exist many variations in the above-mentioned procedure for assembling one or more transportation cables into a hose. For example, connectors, such as connectors 470 and 465 may be preassembled on a transportation cable, such as transportation cable 305, prior to insertion into a hose such as hose 450. Furthermore, hose components, such as connector 455, connector 460, mounting bracket 130, and mounting bracket 135 may be assembled onto hose 450 either before or after transportation cable 305 has been inserted into and drawn out of hose 450.

Transportation cable 305 may be inserted through hose 450 using mechanisms and procedures other than that described using FIG. 11. For example, compressed air or suction processes, as used to draw an electrical cable through a metal conduit in a building, may be employed. When using compressed air, one end of draw line 454 is inserted into opening 10 of hose 450. Compressed air generated by a compressor (not shown) is then employed at opening 10 to force draw line 454 and transportation cable 305, which is attached to draw line 454, through hose 450. When using suction, one end of draw line 454 is inserted into opening 10 of hose 450. Suction generated by a vacuum pump for example, is then employed at opening 15 to suck draw line 454 and transportation cable 305, which is attached to draw line 454, through hose 450.

It will be further understood that it is not necessary to linearly extend hose 450 as described using FIG. 11, when using one or more of such assembly procedures. A fully-coiled or a partially-coiled hose 450 may also be used when drawing transportation cable 305 through hose 450.

Figure 13:
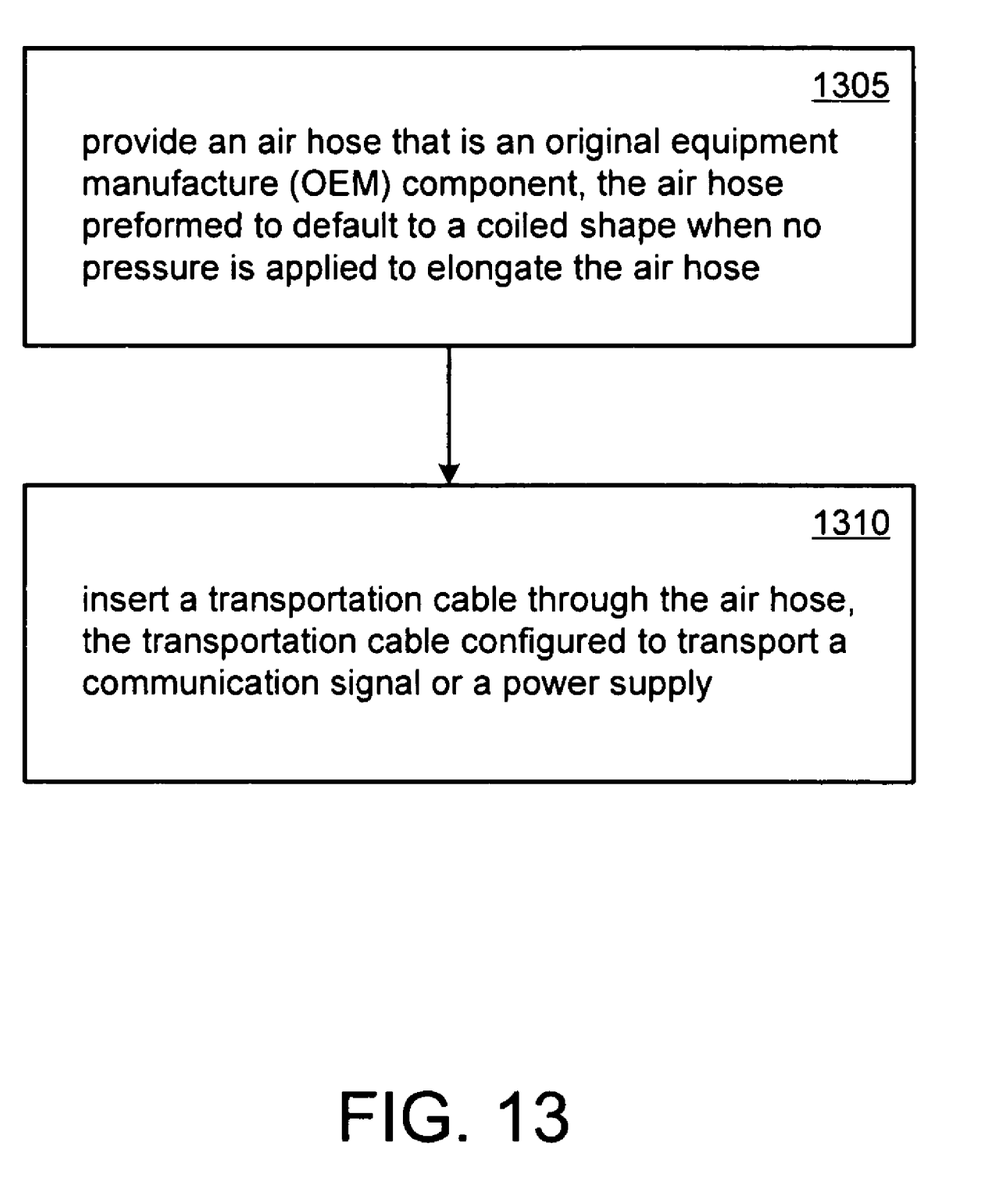
FIG. 13 shows a flowchart of an exemplary method for manufacturing a cable assembly for a lift truck.

Attention is now drawn to FIG. 13, which shows a flowchart of one exemplary method for manufacturing a cable assembly for a lift truck. In block 1305, an air hose is provided. The air hose is an original equipment manufacture (OEM) component that is preformed to default to a coiled shape when no pressure is applied to elongate the air hose. The air hose is provided, in one exemplary embodiment, with no connectors attached to either end. In another exemplary embodiment, one or more connectors are assembled at one or both ends of the air hose.

In block 1310, a transportation cable is inserted through the air hose. The transportation cable is selected to transport a communication signal or a power supply. The transportation cable is inserted through the air hose, in one exemplary embodiment, with no connectors attached to either end. In another exemplary embodiment, one or more connectors are assembled at one or both ends of the transportation cable prior to insertion through the air hose.

The above-described embodiments are merely set forth for a clear understanding of the principles of the disclosure. Many variations and modifications may be made without departing substantially from the disclosure. All such modifications and variations are included herein within the scope of this disclosure.

We claim:

1. A cable assembly for a lift truck, the cable assembly comprising:
   a first transportation cable for transporting at least one of a first communication signal and a first power supply voltage; and
   a self-retracting hose comprising a slick external surface that is selected to prevent adherence of the surface to any portion of the lift truck, the self-retracting hose preformed to default to a coiled shape when no pressure is applied to elongate the self-retracting hose, and wherein the first transportation cable is loosely housed inside the self-retracting hose.

2. The cable assembly of claim 1, wherein the self-retracting hose is a self-retracting nylon air hose and the first transportation cable provides communicative coupling between a first electronic component of a radio frequency identification (RFID) system of the lift truck and a second electronic component of the RFID system of the lift truck.

3. The cable assembly of claim 2, wherein the first electronic component is located in a cab of the lift truck and the second electronic component is an antenna that is mounted on a moveable carriage of the lift truck.

4. The cable assembly of claim 3, further comprising a braided, metal sheath encasing the first transportation cable.

5. The cable assembly of claim 2, further comprising a second transportation cable, wherein the first transportation cable is configured to carry the first communication signal and the second transportation cable is configured to transport the first power supply voltage.

6. The cable assembly of claim 2, wherein the first transportation cable is a fiber optic conductor configured to carry an optical RFID signal.

7. The cable assembly of claim 2, wherein the first transportation cable is a coaxial conductor configured to carry a radio frequency (RF) signal.

8. The cable assembly of claim 2, wherein the nylon hose further comprises a pivoting connector at one end of the nylon hose, the pivoting connector providing the nylon hose rotational freedom around a longitudinal axis of the pivoting connector.

9. The cable assembly of claim 1, wherein the first power supply voltage comprises at least one of a direct current (DC) voltage and an alternating current (AC) voltage.

10. The cable assembly of claim 1, wherein the first transportation cable includes an outer metal jacket that is connected to a connector located at one end of the self-retracting hose.

* * * * *